United States Patent
Lin et al.

(10) Patent No.: US 12,469,474 B2
(45) Date of Patent: Nov. 11, 2025

(54) IMAGE PROCESSING METHOD, CONTROLLER, AND NON-TRANSITORY COMPUTER READABLE STORAGE MEDIUM

(71) Applicant: Realtek Semiconductor Corporation, Hsinchu (TW)

(72) Inventors: Te Yu Lin, Hsinchu (TW); FangHsiung Chen, Hsinchu (TW); Cheng Yueh Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 18/669,501

(22) Filed: May 20, 2024

(65) Prior Publication Data

US 2024/0412709 A1 Dec. 12, 2024

(30) Foreign Application Priority Data

Jun. 7, 2023 (TW) .................................. 112121230

(51) Int. Cl.
*G09G 5/04* (2006.01)
*G01J 3/28* (2006.01)

(52) U.S. Cl.
CPC .............. *G09G 5/04* (2013.01); *G01J 3/2823* (2013.01); *G01J 2003/283* (2013.01); *G09G 2320/0666* (2013.01)

(58) Field of Classification Search
CPC . G09G 5/04; G09G 2320/0666; G01J 3/2823; G01J 2003/283
See application file for complete search history.

(56) References Cited

U.S. PATENT DOCUMENTS

| | | | | |
|---|---|---|---|---|
| 10,482,843 | B2 * | 11/2019 | Guest | G09G 5/14 |
| 10,600,213 | B2 * | 3/2020 | Shih | G06T 11/001 |
| 11,328,687 | B2 * | 5/2022 | Chen | G09G 5/10 |
| 2017/0294175 | A1 * | 10/2017 | Chen | G09G 5/10 |
| 2018/0233107 | A1 * | 8/2018 | Wu | G09G 3/3607 |
| 2022/0245861 | A1 * | 8/2022 | Chang | G06T 7/90 |

FOREIGN PATENT DOCUMENTS

| | | | | |
|---|---|---|---|---|
| CN | 104335144 A | 2/2015 | | |
| CN | 114299887 A | 4/2022 | | |
| TW | I717697 B | * | 2/2021 | G06F 3/038 |

* cited by examiner

*Primary Examiner* — Jeff Piziali
(74) *Attorney, Agent, or Firm* — CKC & Partners Co., LLC (57) ABSTRACT

An image processing method includes following operations: acquiring, by a spectrum analyzer, spectrum information of a display device; calculating, by a processor, a first low blue light parameter according to the spectrum information; transmitting, by the processor, the first low blue light parameter to the display device; calculating, by the display device, first blue light hazard intensity of a first region of input image data; and when the first blue light hazard intensity is greater than a first threshold value, applying, by the display device, the first low blue light parameter to the first region so as to output a final image.

10 Claims, 7 Drawing Sheets

IMAGE PROCESSING METHOD, CONTROLLER, AND NON-TRANSITORY COMPUTER READABLE STORAGE MEDIUM

RELATED APPLICATIONS

This application claims priority to Taiwanese Application Serial Number 112121230, filed Jun. 7, 2023, which is herein incorporated by reference.

BACKGROUND

Technical Field

The present disclosure relates to image processing technology. More particularly, the present disclosure relates to an image processing method, a controller, and a non-transitory computer readable storage medium capable of satisfying requirements of low blue light.

Description of Related Art

With development of technology, many electronic devices are equipped with display devices. However, due to strong energy of blue light with shorter wavelengths, it is likely to cause adverse effects on eyes. Accordingly, needs for display devices with low blue light functions gradually increase.

SUMMARY

Some aspects of the present disclosure are to provide an image processing method. The image processing method includes following operations: acquiring, by a spectrum analyzer, spectrum information of a display device; calculating, by a processor, a first low blue light parameter according to the spectrum information; transmitting, by the processor, the first low blue light parameter to the display device; calculating, by the display device, first blue light hazard intensity of a first region of input image data; and when the first blue light hazard intensity is greater than a first threshold value, applying, by the display device, the first low blue light parameter to the first region so as to output a final image.

Some aspects of the present disclosure are to provide a controller. The controller is configured to be disposed in a display device. The controller is configured to: receive a first low blue light parameter stored in a memory in the display device; calculate first blue light hazard intensity of a first region of input image data; and when the first blue light hazard intensity is greater than a first threshold value, apply the first low blue light parameter to the first region for a screen in the display device to display a final image.

Some aspects of the present disclosure are to provide a non-transitory computer readable storage medium configured to store one or more computer programs including a plurality of instructions. When a processor executes the instructions, the processor performs following operations: receiving spectrum information of a display device, in which the spectrum information is from a spectrum analyzer; calculating a first low blue light parameter according to the spectrum information; and transmitting the first low blue light parameter to the display device for the display device to determine whether to apply the first low blue light parameter to a first region according first blue light hazard intensity of the first region.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
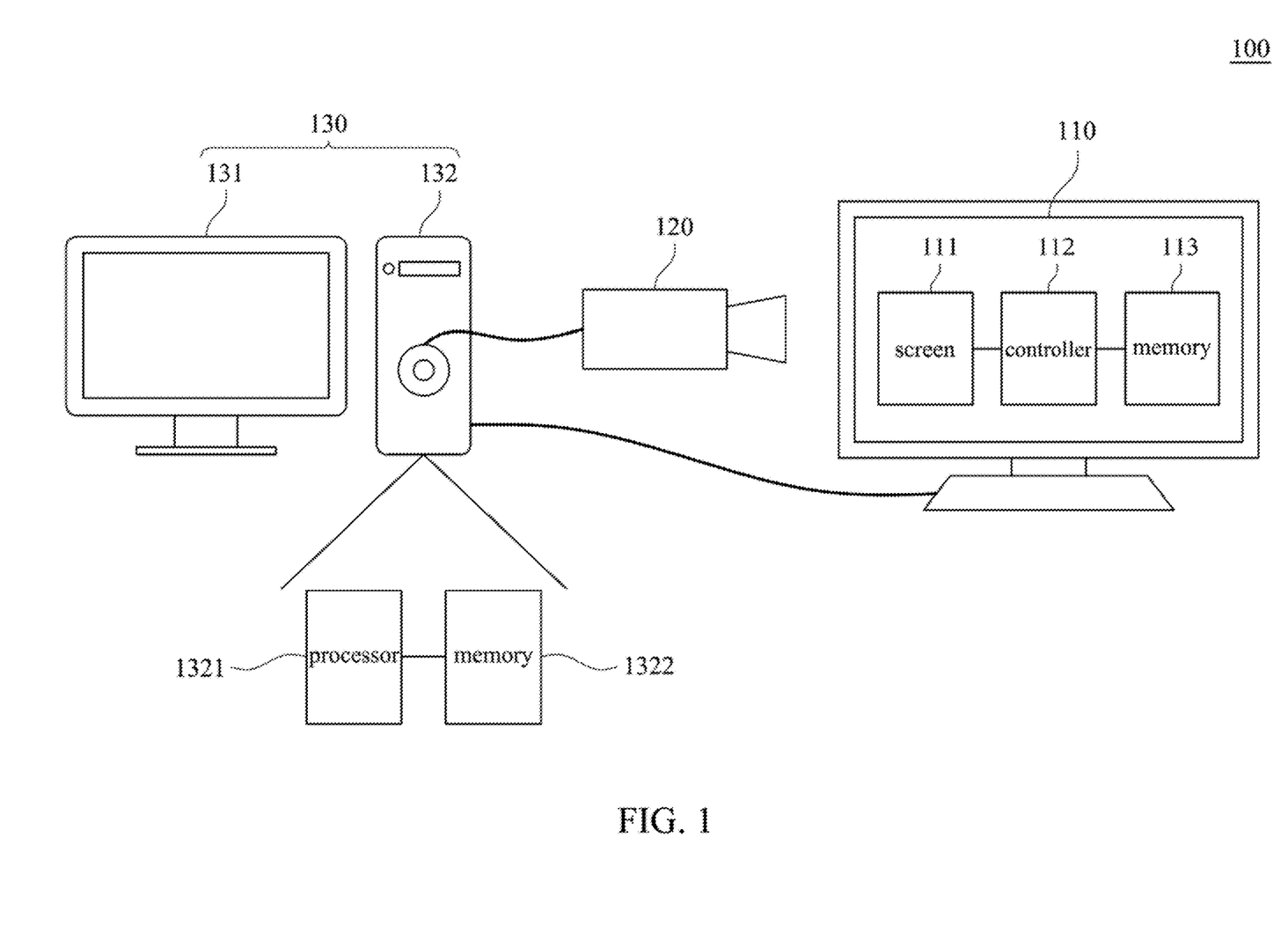
FIG. 1 is a schematic diagram of a display system according to some embodiments of the present disclosure.

Reference is made to FIG. 1. FIG. 1 is a schematic diagram of a display system 100 according to some embodiments of the present disclosure.

As illustrated in FIG. 1, the display system 100 includes a display device 110, a spectrum analyzer 120, and a processor device 130. The display device 110 is coupled to the processor device 130. The spectrum analyzer 120 is also coupled to the processor device 130.

The display device 110 can include a screen 111, a controller 112, and a memory 113. The screen 111 and the memory 113 are coupled to the controller 112. In some embodiments, the controller 112 can be implemented by a scaler. For simplicity and clarity, other elements in the display device 110 are omitted in FIG. 1.

The spectrum analyzer 120 can shoot toward the screen 111 to acquire spectrum information of an image on the screen 111.

The processor device 130 can be an electronic device having data processing functions or data calculating functions. In the example of FIG. 1, the processor device 130 is a desktop computer device, but the present disclosure is not limited thereto. Various suitable processor devices are within the contemplated scope of the present disclosure. The processor device 130 can include a screen 131 and a host 132. The screen 131 is coupled to the host 132. The host 132 can include a processor 1321 and a memory 1322. The processor 1321 is coupled to the memory 1322. In some embodiments, the processor 1321 is implemented by a central processor or a microprocessor. In some embodiments, the memory 1322 is implemented by a non-transitory computer readable storage medium. The non-transitory computer readable storage medium is, for example, a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains. The memory 1322 is configured to store one or more computer programs including a plurality of instructions.

Figure 2:
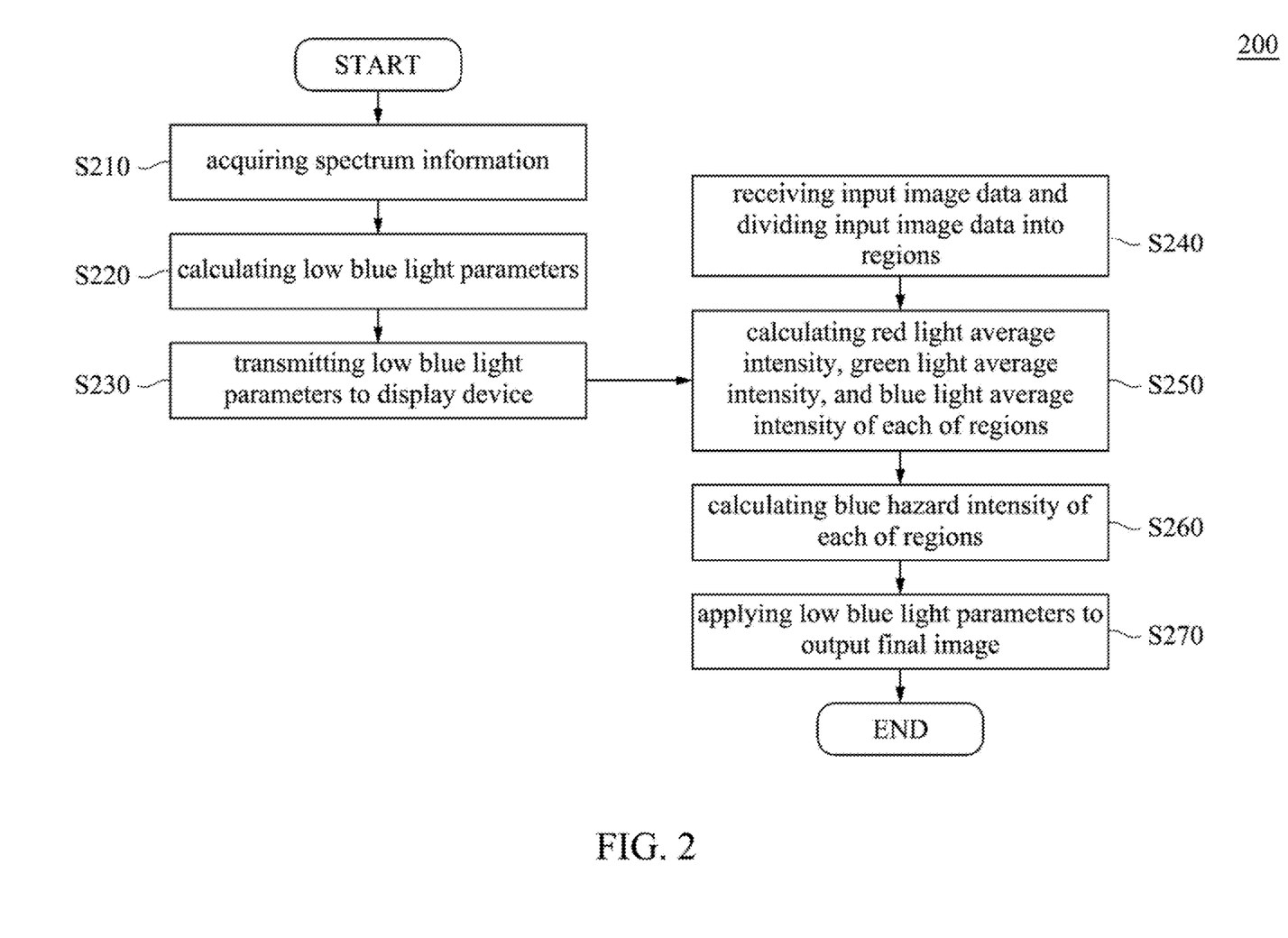
FIG. 2 is a flow diagram of an image processing method according to some embodiments of the present disclosure.

References are made to FIG. 1 and FIG. 2. FIG. 2 is a flow diagram of an image processing method 200 according to some embodiments of the present disclosure.

In some embodiments, the image processing method 200 can be applied to the display system 100 in FIG. 1, but the present disclosure is not limited thereto. For ease of understanding, the image processing method 200 is described in following paragraphs with reference to the display system 100 in FIG. 1.

As illustrated in FIG. 2, the image processing method 200 includes operation S210, operation S220, operation S230, operation S240, operation S250, operation S260, and operation S270.

In operation S210, the spectrum analyzer 120 acquires spectrum information of the display device 110. For example, the screen 111 in the display device 110 can display a white light image, a red light image, a green light image, and a blue light image sequentially. The spectrum analyzer 120 can shoot the white light image, the red light image, the green light image, and the blue light image respectively to acquire the spectrum information of these images. The spectrum information acquired by the spectrum analyzer 120 can include a spectrum of the white light, a spectrum of the red light, a spectrum of the green light, a spectrum of the blue light, chromaticity coordinates and luminance of the white light ($x_w$ $y_w$ $Lv_w$), chromaticity coordinates and luminance of the red light ($x_r$ $y_r$ $Lv_r$), chromaticity coordinates and luminance of the green light ($x_g$ $y_g$ $Lv_g$), and chromaticity coordinates and luminance of the blue light ($x_b$ $y_b$ $Lv_b$).

In operation S220, the processor 1321 calculates at least one low blue light parameter according to spectrum information. In some embodiments, the aforementioned at least one low blue light parameter can include one set or multiple sets of low blue light parameters. In some embodiments, the aforementioned at least one low blue light parameter can include one set of first low blue light parameters and one set of second low blue light parameters. In some embodiments, the aforementioned at least one low blue light parameter can include multiple sets of first low blue light parameters and multiple sets of second low blue light parameters. In the example described in following paragraphs, the first low blue light parameter is used for regions with strong blue light hazard intensity, and the second low blue light parameter is used for regions with medium blue light hazard intensity. The details of how the processor 1321 calculates these low blue light parameters according to the spectrum information are described in following paragraphs related to FIG. 5.

In operation S230, the processor 1321 transmits the aforementioned at least one low blue light parameter to the display device 110. In some embodiments, the aforementioned at least one low blue light parameter can be stored in the memory 113 in the display device 110.

Figure 3:
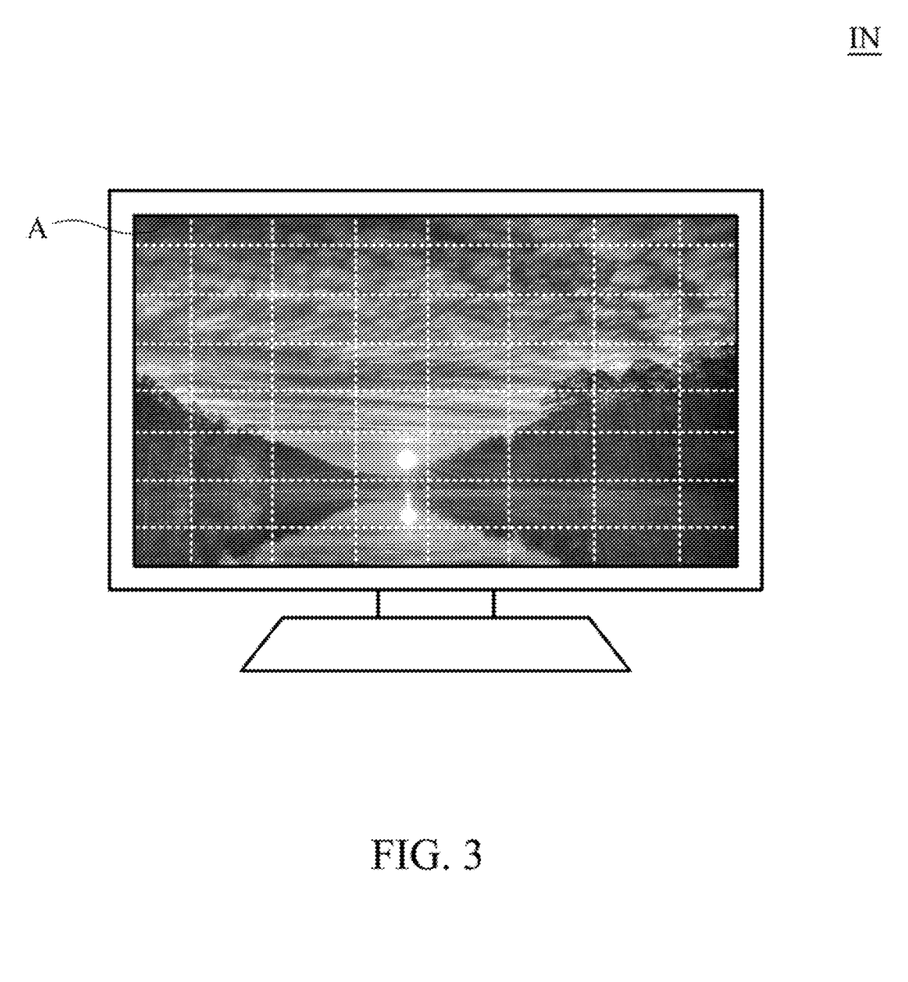
FIG. 3 is a schematic diagram of input image data according to some embodiments of the present disclosure.

References are made to FIG. 2 and FIG. 3. FIG. 3 is a schematic diagram of input image data IN according to some embodiments of the present disclosure.

In operation S240, the display device 110 receives the input image data IN and the controller 112 in the display device 110 can partition the input image data IN. As illustrated in FIG. 3, the input image data IN is divided into multiple regions A.

In operation S250, the controller 112 calculates a red light average intensity of each of the regions A, a green light average intensity of each of the regions A, and a blue light average intensity of each of the regions A.

In operation S260, the controller 112 calculates the blue light hazard intensity of each of the regions A according to the red light average intensity of each of the regions A, the green light average intensity of each of the regions A, and the blue light average intensity of each of the regions A. For example, the blue light hazard intensity of each of the regions A can be derived according to formula (1) below:

$$BI = \frac{\frac{Av(B)}{255} \times \sum_{peak-20}^{peak+20} E_B(\lambda)}{\frac{Av(R)}{255} \times \sum_{380}^{780} E_R(\lambda) + \frac{Av(G)}{255} \times \sum_{380}^{780} E_G(\lambda) + \frac{Av(B)}{255} \times \sum_{380}^{780} E_B(\lambda)} \quad (1)$$

in which BI is the blue light hazard intensity of one region A, Av(R) is the red light average intensity of the region A, Av(G) is the green light average intensity of the region A, Av(B) is the green light average intensity of the region A, $\Sigma_{peak-20}^{peak+20} E_B(\lambda)$ is a sum of energy between a first wavelength (a wavelength of the blue light peak plus 20 nanometers) and a second wavelength (a wavelength of the blue light peak minus 20 nanometers), $\Sigma_{380}^{780} E_R(\lambda)$ is a sum of energy of the red light, $\Sigma_{380}^{780} E_G(\lambda)$ is a sum of energy of the green light, and $\Sigma_{380}^{780} E_B(\lambda)$ is a sum of energy of the blue light.

In operation S270, the controller 112 applies the low blue light parameters stored in the memory 113 to the regions A correspondingly according to the blue light hazard intensities of the regions A for the screen 111 to display (output) a final image.

Figure 4:
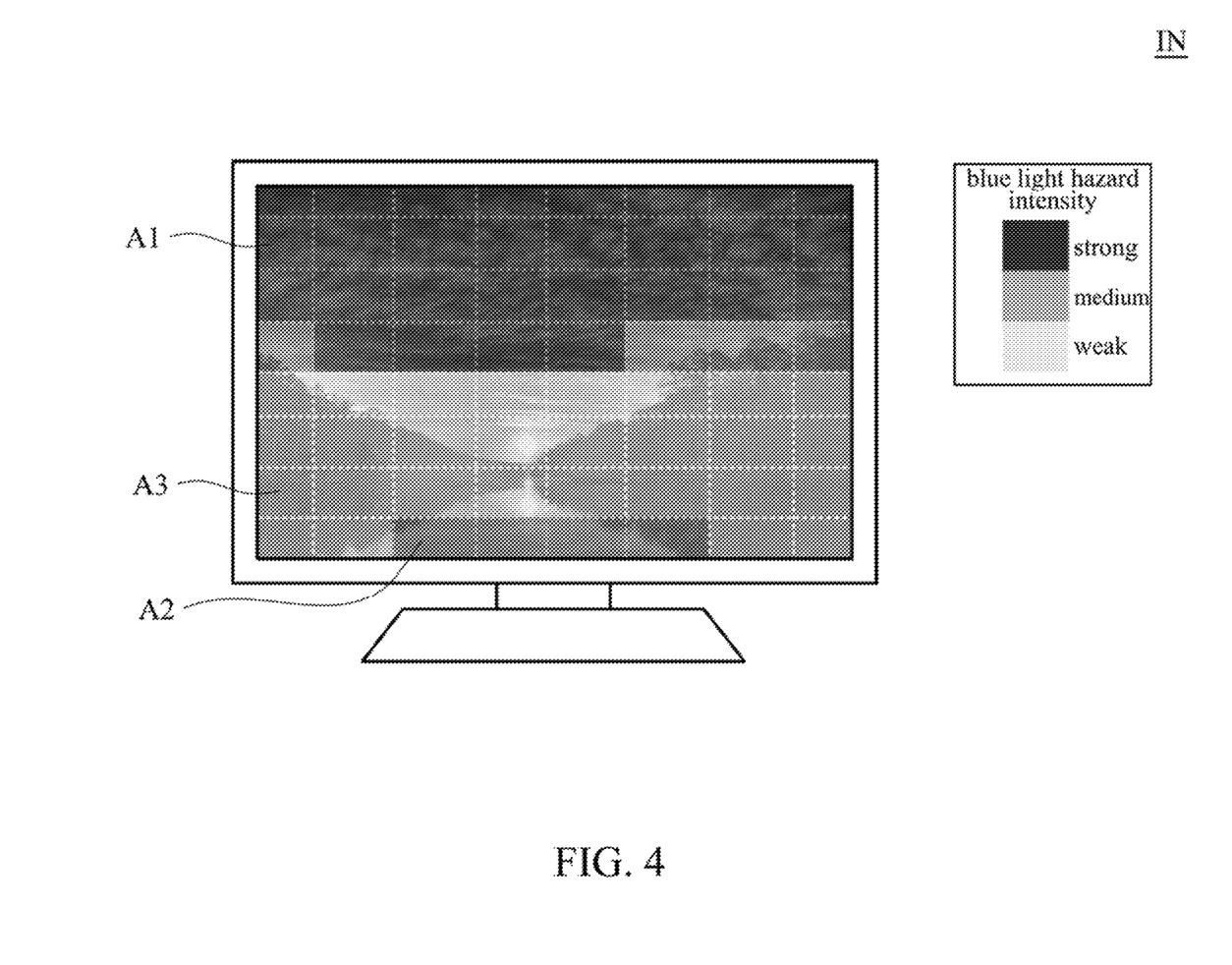
FIG. 4 is a schematic diagram of a plurality of regions corresponding to different blue light hazard intensities of the input image data in FIG. 3 according to some embodiments of the present disclosure.

References are made to FIG. 1 and FIG. 4. FIG. 4 is a schematic diagram of the regions A corresponding to different blue light hazard intensities of the input image data IN in FIG. 3 according to some embodiments of the present disclosure.

As illustrated in FIG. 4, the blue light hazard intensities of the regions A1 are greater than a first threshold value (e.g., blue light ratio values are greater than 23%), so the regions A1 are determined as regions with strong blue light hazard intensities. The blue light hazard intensities of the regions A2 are greater than a second threshold value and less than or equal to the first threshold value (the second threshold value is less than the first threshold value) (e.g., blue light ratio values are greater than 21% and less than or equal to 23%), so the regions A2 are determined as regions with medium blue light hazard intensities. The blue light hazard intensities of the region A3 are less than or equal to a third threshold value (the third threshold value is less than the second threshold value) (e.g., blue light ratio values are less than or equal to 20%), so the regions A3 are determined as regions with weak blue light hazard intensities.

Accordingly, the controller 112 can apply the first low blue light parameter in the memory 113 to the regions A1, apply the second low blue light parameter in the memory 113 to the regions A2, and maintain (without applying any low blue light parameter) the regions A3 to generate the final image. The controller 112 can send the final image to the screen 111. The screen 111 can display (output) the final image.

Figure 5:
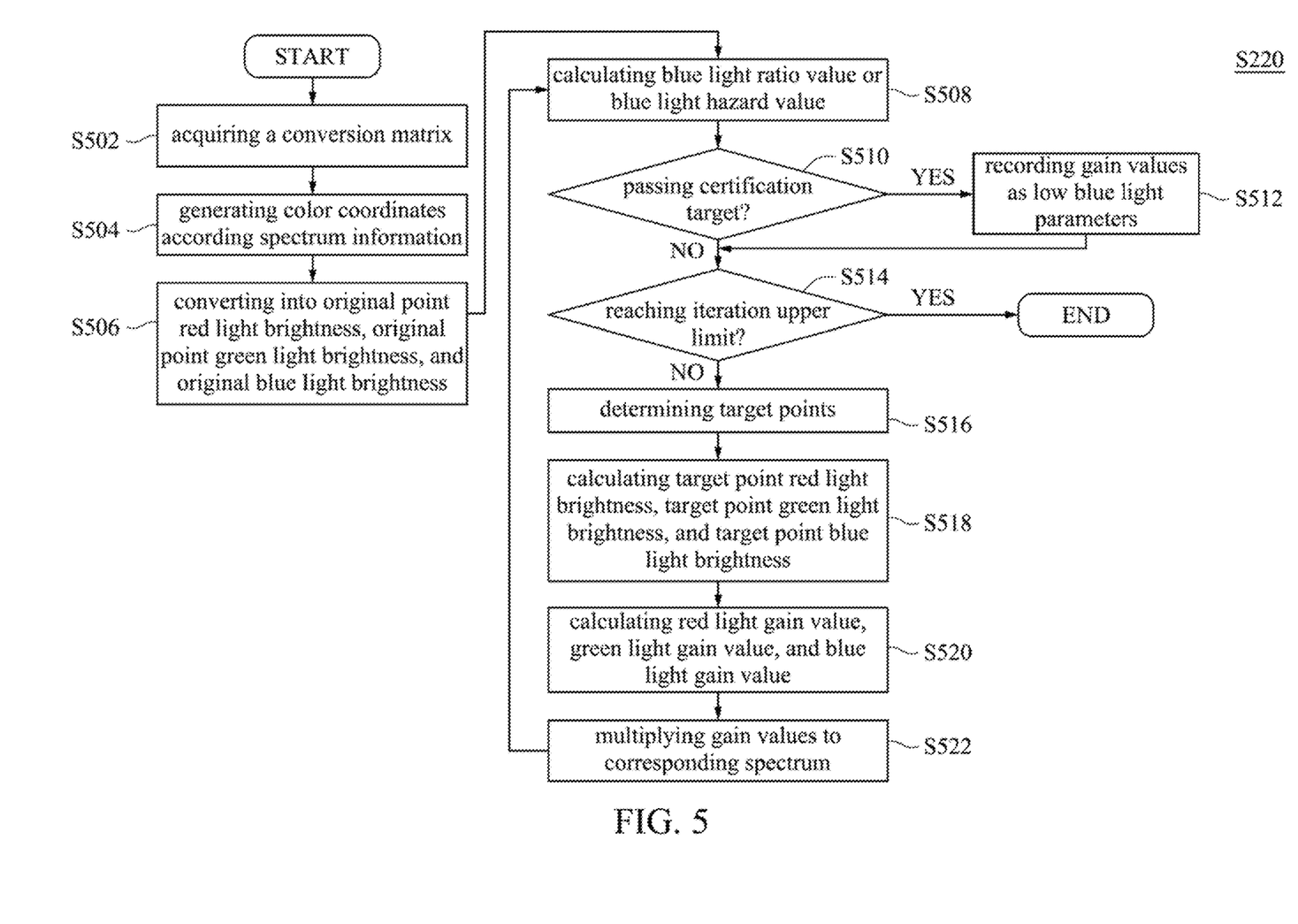
FIG. 5 is a detailed flow diagram of operation in FIG. 2 according to some embodiments of the present disclosure.

References are made to FIG. 1 and FIG. 5. FIG. 5 is a detailed flow diagram of operation S220 in FIG. 2 according to some embodiments of the present disclosure. As described above, the details of how the processor 1321 calculates the low blue light parameters according to the spectrum information (operation S220 in FIG. 2) are described in following paragraphs related to FIG. 5.

As illustrated in FIG. 5, operation S220 includes sub-operation S502, sub-operation S504, sub-operation S506, sub-operation S508, sub-operation S510, sub-operation S512, sub-operation S514, sub-operation S516, sub-operation S518, sub-operation S520, and sub-operation S522. In some embodiments, the processor 1321 can execute the instructions in the memory 1322 to perform the sub-operations in FIG. 5.

In sub-operation S502, the processor 1321 acquires a conversion matrix. The matrix can be configured to convert a color coordinates (e.g., CIE1931 color coordinates) into pure color brightness.

Figure 6:
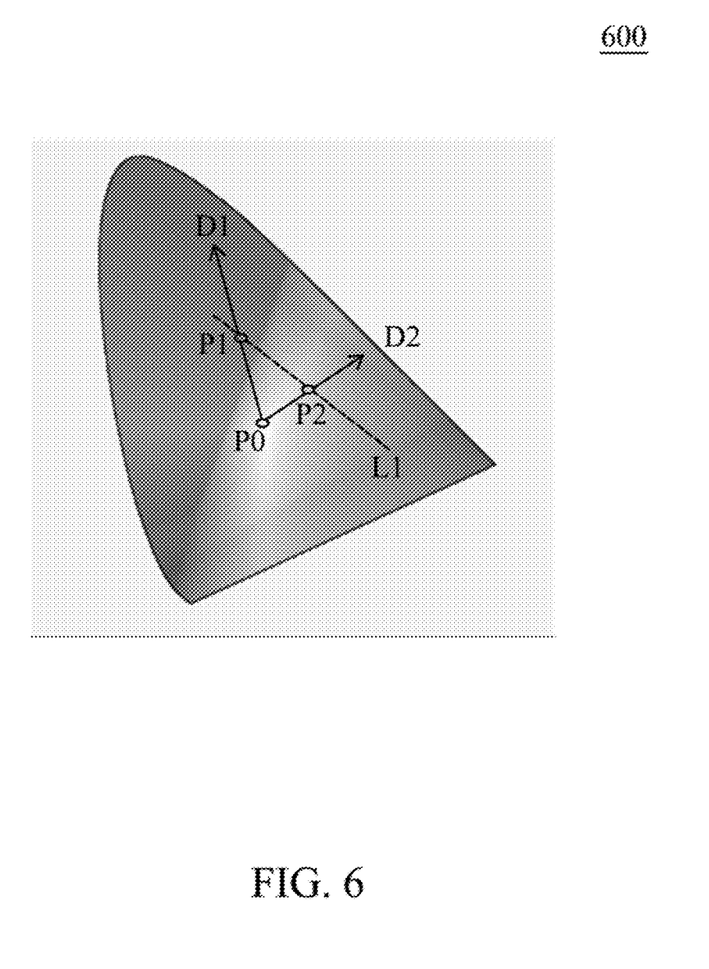
FIG. 6 is a schematic diagram of a color space according to some embodiments of the present disclosure.

References are made to FIG. 5 and FIG. 6. FIG. 6 is a schematic diagram of a color space 600 according to some embodiments of the present disclosure.

In sub-operation S504, the processor 1321 receives the spectrum information acquired in operation S210 in FIG. 2 and generates the color coordinates ($X_W$ $Y_W$ $Z_W$) of an original point (e.g., a white point) P0 according to the spectrum information. To be more specific, the processor 1321 can calculate the color coordinates ($X_W$ $Y_W$ $Z_W$) of the original point P0 according to the chromaticity coordinates and luminance of the white light ($x_w$ $y_w$ $Lv_w$) in the spectrum information.

In sub-operation S506, the processor 1321 utilizes the conversion matrix to convert the color coordinates of the original point P0 into an original point red light brightness, an original point green light brightness, and an original point blue light brightness. For example, the processor 1321 can perform the above conversion according to formula (2) below:

$$[Y_R \ Y_G \ Y_B] = [X_w \ Y_w \ Z_w] \cdot \begin{bmatrix} \frac{x_r}{y_r} & 1 & \frac{1-x_r-y_r}{y_r} \\ \frac{x_g}{y_g} & 1 & \frac{1-x_g-y_g}{y_g} \\ \frac{x_b}{y_b} & 1 & \frac{1-x_b-y_b}{y_b} \end{bmatrix}^{-1} \quad (2)$$

in which [$X_W$ $Y_W$ $Z_W$] is the color coordinates of the original point P0, [$Y_R$ $Y_G$ $Y_B$] is the original point red light brightness, the original point green light brightness, and the original point blue light brightness.

In sub-operation S508, the processor 1321 calculates a blue light ratio value or a blue light hazard value. In some embodiments, the processor 1321 can calculate the blue light ratio value according to formula (3) below:

$$BR = \sum\nolimits_{peak-20}^{peak+20} E_B(\lambda) / \sum\nolimits_{380}^{780} E(\lambda) \quad (3)$$

in which BR is the blue light ratio value, $\sum_{380}^{780} E(\lambda)$ is a sum of energy in a spectrum, $\sum_{peak-20}^{peak+20} E_B(\lambda)$ is a sum of energy between a first wavelength (a wavelength of the blue light peak plus 20 nanometers) and a second wavelength (a wavelength of the blue light peak minus 20 nanometers).

In sub-operation S510, the processor 1321 determines whether the blue light ratio value passes the certification target. In some embodiments, the certification target can be designed as a certification value (e.g., 20%). In other words, in sub-operation S510, the processor 1321 determines whether the blue light ratio value is equal to or less than the certification value. When the blue light ratio value is equal to or less than the certification value, it represents that it satisfies requirements of low blue light. The value of the above certification value is merely for illustration, and the present disclosure is not limited thereto.

At first, for the region A1 with strong blue light hazard intensity (e.g., the blue light ratio value is greater than 23%), the processor 1321 can select a white point with 23% blue light ratio value as the original point P0. For this original point P0, since the blue light ratio value of the original point P0 (e.g., 23%) is greater than the certification value (e.g., 20%), the processor 1321 determines that the original point P0 does not pass the certification target. Then, it enters into sub-operation S514.

In sub-operation S514, the processor 1321 determines whether an iteration number reaches an iteration upper limit. If yes, the flow ends. If no, it enters into sub-operation S516.

In sub-operation S516, the processor 1321 determines a next target point P1. A coordinate distance between the target point P1 and the original point P0 in the color space 600 can be preset and can be designed according to actual needs.

In sub-operation S518, the processor 1321 calculates a target point red light brightness of the target point P1, a target point green light brightness of the target point P1, and a target point blue light brightness of the target point P1 according to content similar to sub-operation S504 and sub-operation S506. To be more specific, the color coordinates of the original point P0 in formula (2) is changed to be the color coordinates of the target point P1.

In sub-operation S520, the processor 1321 calculates a first red light gain value, a first green light gain value, and a first blue light gain value according to the original point red light brightness, the original point green light brightness, and the original point blue light brightness calculated in sub-operation S506 and the target point red light brightness of the target point P1, the target point green light brightness of the target point P1, and the target point blue light brightness of the target point P1 calculated in sub-operation S518. For example, the first red light gain value is a ratio of the target point red light brightness of the target point P1 and the original point red light brightness. The first green light gain value is a ratio of the target point green light brightness of the target point P1 and the original point green light brightness. The first blue light gain value is a ratio of the target point blue light brightness of the target point P1 and the original point blue light brightness.

Figure 7:
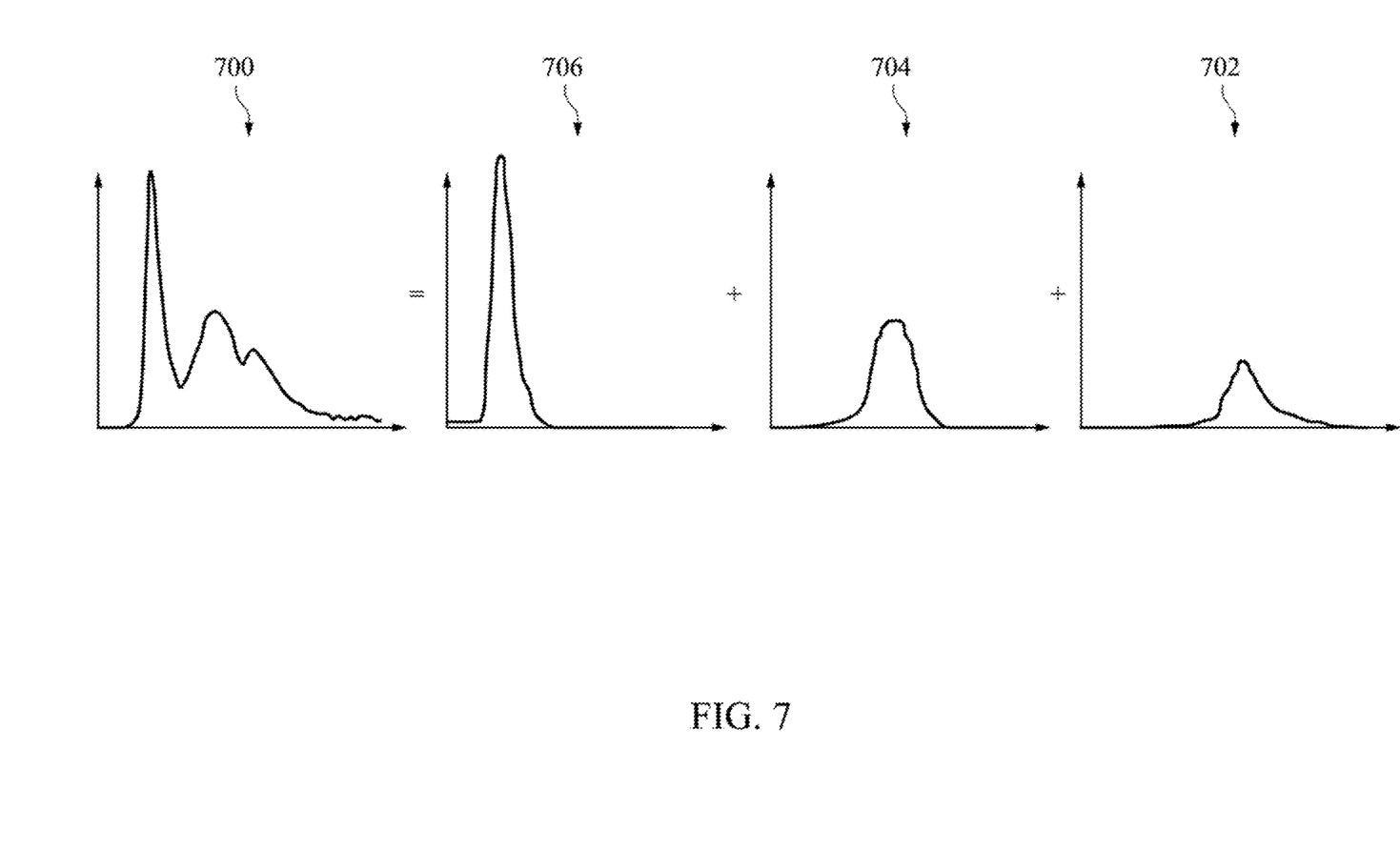
FIG. 7 is a schematic diagram of a white light spectrum according to some embodiments of the present disclosure.

Reference is made to FIG. 7. FIG. 7 is a schematic diagram of a white light spectrum 700 according to some embodiments of the present disclosure. The white light spectrum 700 is composed of a red light spectrum 702, a green light spectrum 704, and a blue light spectrum 706.

References are made to FIG. 5 and FIG. 7. In sub-operation S522, the processor 1321 multiplies the first red light gain value, the first green light gain value, and the first blue light gain value to the red light spectrum 702, the green light spectrum 704, and the blue light spectrum 706 respectively to generate an adjustment result.

Then, it enters into sub-operation S508 again. The processor 1321 calculates the blue light ratio value of the adjustment result according the above formula (3).

Then, it enters into sub-operation S510 again. When the newly calculated blue light ratio value passes the certification target (equal to or less than the certification value), it enters into sub-operation S512. When the newly calculated blue light ratio value does not pass the certification target (greater than the certification value), it enters into sub-operation S514.

In sub-operation S512, the processor 1321 records the first red light gain value, the first green light gain value, and the first blue light gain value, and the processor 1321 sets the first red light gain value, the first green light gain value, and the first blue light gain value as one set of first low blue light parameters.

In sub-operation S514, when the processor 1321 determines that the iteration number does not reach the iteration upper limit, it enters into sub-operation S516.

In sub-operation S516, the processor 1321 determines a next target point P2.

Then, similar to aforementioned descriptions, in sub-operation S518, the processor 1321 calculates a target point red light brightness of the target point P2, a target point green light brightness of the target point P2, and a target point blue light brightness of the target point P2 according content similar to sub-operation S504 and sub-operation S506. To be more specific, the color coordinates of the original point P0 in formula (2) is changed to be the color coordinates of the target point P2.

In sub-operation S520, the processor 1321 calculates a second red light gain value, a second green light gain value, and a second blue light gain value according to the original point red light brightness, the original point green light brightness, and the original point blue light brightness calculated in sub-operation S506 and the target point red light brightness of the target point P2, the target point green light brightness of the target point P2, and the target point blue light brightness of the target point P2 calculated in sub-operation S518. Similarly, the second red light gain value is a ratio of the target point red light brightness of the target point P2 and the original point red light brightness. The second green light gain value is a ratio of the target point green light brightness of the target point P2 and the original point green light brightness. The second blue light gain value is a ratio of the target point blue light brightness of the target point P2 and the original point blue light brightness.

In sub-operation S522, the processor 1321 multiplies the second red light gain value, the second green light gain value, and the second blue light gain value to the red light spectrum 702, the green light spectrum 704, and the blue light spectrum 706 in FIG. 7 respectively to generate an adjustment result.

Then, it enters into sub-operation S508 again. The processor 1321 calculates the blue light ratio value of the adjustment result according the above formula (3).

Then, it enters into sub-operation S510 again. When the newly calculated blue light ratio value passes the certification target (equal to or less than the certification value), it enters into sub-operation S512. When the newly calculated blue light ratio value does not pass the certification target (greater than the certification value), it enters into sub-operation S514.

In sub-operation S512, the processor 1321 records the second red light gain value, the second green light gain value, and the second blue light gain value, and the processor 1321 sets the second red light gain value, the second green light gain value, and the second blue light gain value as another set of first low blue light parameters.

Reference is made to FIG. 2 again. As described above, in operation S230, the all first low blue light parameters are transmitted to the display device 110 and are stored in the memory 113 for the controller 112 to apply these first low blue light parameters to the regions A1 with strong blue light hazard intensities in FIG. 4. After applying these first low blue light parameters, the blue light ratio values of the regions A1 are equal to or less than the certification value (pass the certification target). Thus, the regions A1 can satisfy requirements of low blue light.

In some embodiments, the controller 112 can select the set of the first low blue light parameters with smallest color difference from all sets of the first low blue light parameters, and apply the selected set of the first low blue light parameters (the selected set of gain values) to the regions A1 with strong blue light hazard intensities in FIG. 4. In some embodiments, the controller 112 can select the set of the first low blue light parameters with closet color temperature from all sets of the first low blue light parameters, and apply the selected set of the first low blue light parameters (the selected set of gain values) to the regions A1 with strong blue light hazard intensities in FIG. 4.

The above descriptions take the regions A1 with strong blue light hazard intensities as an example. For the regions A2 with medium blue light hazard intensities (e.g., the blue light ratio values are greater than 21% and less than or equal to 23%), the processor 1321 can select a white point with 21% blue light ratio value as the original point (e.g., a color temperature of this original point is different from a the color temperature of the aforementioned original point P0), and sub-operation S512 generates one set or multiple sets of second low blue light parameters. Similarly, the all second low blue light parameters are transmitted to the display device 110 and are stored into the memory 113 for the controller 112 to apply these second low blue light parameters to the regions A2 with medium blue light hazard intensities in FIG. 4. After applying these second low blue light parameters, the blue light ratio values of the regions A2 are equal to or less than the certification value (pass the certification target). Thus, the regions A2 can satisfy requirements of low blue light.

In some related approaches, in order to satisfy the requirements of low blue light, only the ratio of the red light, the green light, and the blue light is adjusted (e.g., to reduce the ratio of the blue light). These related approaches is without any spectrum analyzer and do not consider spectrum information. This will cause the final image to have a color cast problem (e.g., yellowish or reddish). In some other related approaches, in order to satisfy the requirements of low blue light, one same set of low blue light parameters are applied to the entire output image. This will reduce image quality of regions with weak blue light hazard intensities.

Compared to the aforementioned related approaches, the present disclosure utilizes the spectrum analyzer to acquire the spectrum information and calculates suitable low blue light parameters dynamically, so the present disclosure can effectively reduce the color cast problem while satisfying requirements of low blue light so as to main image quality. In some further embodiments, the present disclosure can further divide the input image data into multiple regions and apply different low blue light parameters to the regions with different blue light hazard intensities. Accordingly, it can maintain the image quality of regions with weak blue light hazard intensities.

References are made to FIG. 1 and FIG. 6 again. In some embodiments, the controller 112 searches multiple target points (not shown) by a fixed distance interval from the original point P0 along a direction D1. It is assumed that the blue light ratio value of the target point P1 is equal to the certification value, it represents that the blue light ratio values of the target points between the original point P0 and the target point P1 along the direction D1 are greater than the certification value, and the blue light ratio values of the target points and outside the target point P1 along the direction D1 are less than the certification value. Accordingly, the controller 112 searches the target points by the fixed distance from the original point P0 along the direction D1 and calculates corresponding gain values. After finding the target point P1 whose blue light ratio value is equal to the certification value, the corresponding gain value of the target point P1 is set as the first low blue light parameter. Then, the controller 112 stops searching the target points outside the target point P1 along the direction D1. Instead, the controller 112 searches multiple target points (not shown) by a fixed distance interval from the original point P0 along a direction D2. It is assumed that the blue light ratio value of the target point P2 is equal to the certification value, it represents that the blue light ratio values of the target points between the original point P0 and the target point P2 along the direction D2 are greater than the certification value, and the blue light ratio values of the target points outside the target point P2 along the direction D2 are less than the certification value. Accordingly, the controller 112 searches the target points by the fixed distance from the original point P0 along the direction D2 and calculates corresponding gain values. After finding the target point P2 whose blue light ratio value is equal to the certification value, the corresponding gain value of the target point P2 is set as the first low blue light parameter. Then, the controller 112 stops searching the target points outside the target point P2 along the direction D2. As illustrated in FIG. 6, the blue light ratio values of all target points on a boundary line L1 (including the target point P1 and P2) are equal to the certification value, the corresponding gain values of the target points on the boundary line L1 are recorded as the first low blue light parameters. Since the blue light ratio values of the target points on the boundary line L1 just pass the certification target (just equal to the certification value), the color cast problem can be reduced effectively while just satisfying requirements of low blue light.

Reference is made to FIG. 5 again. In some other embodiments, in sub-operation S508, the processor 1321 can calculate the blue light hazard value according to formula (4) below:

$$L_B = \sum_{380}^{780} E(\lambda) * B(\lambda) \qquad (4)$$

in which $L_B$ is the blue light hazard value, $E(\lambda)$ is energy of a spectrum, $B(\lambda)$ is a blue light hazard function. The formula (4) is based on IEC62471 standard.

Then, in sub-operation S510, the processor 1321 determines whether the blue light hazard value passes a certification target to perform subsequent similar operations.

In some other embodiments, in sub-operation S508, the processor 1321 can calculate the blue light ratio value and the blue light hazard value according to the above formula (3) and formula (4). Then, in sub-operation S510, the processor 1321 determines whether both of the blue light ratio value and the blue light hazard value pass certification targets to perform subsequent similar operations.

As described above, in the present disclosure, it can effectively reduce the color cast problem while satisfying requirements of low blue light so as to main image quality.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image processing method, comprising:
   acquiring, by a spectrum analyzer, spectrum information of a display panel, wherein the spectrum information comprises a red light spectrum, a green light spectrum, and a blue light spectrum;
   calculating, by a processor, a first blue light parameter according to a first red light gain value, a first green light gain value, a first blue light gain value, the red light spectrum, the green light spectrum, and the blue light spectrum;
   transmitting, by the processor, the first blue light parameter to the display panel;
   calculating, by the display panel, first blue light hazard intensity of a first region of input image data; and
   applying, by the display panel, the first blue light parameter to the first region so as to output a final image in response to the first blue light hazard intensity which is greater than a first threshold value.

2. The image processing method of claim 1, further comprising:
   calculating, by the processor, a second blue light parameter according to the spectrum information;
   transmitting, by the processor, the second blue light parameter to the display panel;
   calculating, by the display panel, second blue light hazard intensity of a second region of the input image data; and
   applying, by the display panel, the second blue light parameter to the second region so as to output the final image in response to the second blue light hazard intensity which is greater than a second threshold value and less than or equal to the first threshold value,
   wherein the second threshold value is less than the first threshold value.

3. The image processing method of claim 2, further comprising:
   calculating, by the display panel, third blue light hazard intensity of a third region of the input image data; and
   maintaining, by the display panel, the third region so as to output the final image in response to the third blue light hazard intensity which is less than or equal to a third threshold value,
   wherein the third threshold value is less than the second threshold value.

4. The image processing method of claim 2, wherein the first blue light parameter is configured to make a first blue light ratio value of the first region equal to or less than a certification value.

5. The image processing method of claim 4, wherein the second blue light parameter is configured to make a second blue light ratio value of the second region equal to or less than the certification value.

6. The image processing method of claim 4, wherein calculating, by the processor, the first blue light parameter according to the first red light gain value, the first green light gain value, the first blue light gain value, the red light spectrum, the green light spectrum, and the blue light spectrum comprises:

calculating, by the processor, the first red light gain value, the first green light gain value, and the first blue light gain value according to the spectrum information and a first target point;

multiplying, by the processor, the first red light gain value, the first green light gain value, and the first blue light gain value to the red light spectrum, the green light spectrum, and the blue light spectrum of a white light spectrum respectively to generate a first adjustment result;

determining, by the processor, a second blue light ratio value of the first adjustment result is equal to or less than the certification value; and setting, by the processor, the first red light gain value, the first green light gain value, and the first blue light gain value as the first blue light parameter in response to the second blue light ratio value of the first adjustment result which is equal to or less than the certification value.

7. The image processing method of claim 6, further comprising:

calculating, by the processor, a second red light gain value, a second green light gain value, and a second blue light gain value according to the spectrum information and a second target point in response to the second blue light ratio value of the first adjustment result which is greater than the certification value;

multiplying, by the processor, the second red light gain value, the second green light gain value, and the second blue light gain value to the red light spectrum, the green light spectrum, and the blue light spectrum respectively to generate a second adjustment result;

determining, by the processor, a third blue light ratio value of the second adjustment result is equal to or less than the certification value; and setting, by the processor, the second red light gain value, the second green light gain value, and the second blue light gain value as the first blue light parameter in response to the third blue light ratio value of the second adjustment result which is equal to or less than the certification value.

8. The image processing method of claim 6, wherein calculating, by the processor, the first red light gain value, the first green light gain value, and the first blue light gain value according to the spectrum information and the first target point comprises:

calculating, by the processor, an original point red light brightness, an original point green light brightness, and an original point blue light brightness according to the spectrum information;

calculating, by the processor, a target point red light brightness, a target point green light brightness, and a target point blue light brightness of the first target point; and calculating, by the processor, the first red light gain value according to the target point red light brightness and the original point red light brightness, the first green light gain value according to the target point green light brightness and the original point green light brightness, and the first blue light gain value according to the target point blue light brightness and the original point blue light brightness.

9. The image processing method of claim 8, wherein calculating, by the processor, the original point red light brightness, the original point green light brightness, and the original point blue light brightness according to the spectrum information comprises:

acquiring, by the processor, a conversion matrix;

generating, by the processor, a color coordinates according to the spectrum information; and converting, by the processor, the color coordinates into the original point red light brightness, the original point green light brightness, or the original point blue light brightness according to the conversion matrix.

10. The image processing method of claim 1, further comprising:

storing, by a memory in the display panel, the first blue light parameter.

* * * * *